United States Patent [19]
Himsworth

[11] Patent Number: 5,999,812
[45] Date of Patent: Dec. 7, 1999

[54] METHOD FOR SELF REGISTRATION AND AUTHENTICATION FOR WIRELESS TELEPHONY DEVICES

[76] Inventor: Winston E. Himsworth, 51 Shore Dr., Plandome, N.Y. 11030

[21] Appl. No.: 08/886,303

[22] Filed: Jul. 1, 1997

[51] Int. Cl.⁶ ................................................. H04B 1/00
[52] U.S. Cl. ............................ 455/435; 455/33; 455/411
[58] Field of Search ................................. 455/33, 34, 54, 455/56, 58, 410, 411; 379/435, 59, 60, 63

[56] References Cited

U.S. PATENT DOCUMENTS

| | | | |
|---|---|---|---|
| 4,876,738 | 10/1989 | Selby | 455/33 |
| 4,916,728 | 4/1990 | Blair | 379/59 |
| 5,090,050 | 2/1992 | Heffernan | 379/60 |
| 5,101,500 | 3/1992 | Marui | 455/33 |
| 5,142,654 | 8/1992 | Sonberg et al. | 379/59 |
| 5,758,281 | 5/1998 | Emery et al. | 455/428 |

*Primary Examiner*—Wellington Chin
*Assistant Examiner*—Pablo Ngu Tran
*Attorney, Agent, or Firm*—Collard & Roe, P.C

[57] ABSTRACT

Additional program logic is provided for wireless devices (or embedded transceivers) and for mobile system providers which permits a wireless device and/or associated application to seek out an authorized wireless service provider, register as an authenticated user on that provider's ; system, and initiate conversation, all in a manner transparent to the end user. The search and authentication process alleviates the need to produce, distribute, or stock different devices, transceivers, or program versions of a given product class, in order to correctly register with different wireless providers in different areas of the country.

12 Claims, 2 Drawing Sheets

METHOD FOR SELF REGISTRATION AND AUTHENTICATION FOR WIRELESS TELEPHONY DEVICES

BACKGROUND OF THE INVENTION

1. Field of the Invention

The present invention relates to wireless telecommunications. More specifically, it relates to a method for self-registration and authentication of wireless telephony devices on mobile communications systems.

2. The Prior Art

A large body of technology, often embodied in general industry standards, exists in the field of wireless telecommunications to permit the registration and authentication of wireless devices on mobile systems. Heretofore, this technology utilized a process requiring each wireless telephony device to be programmed prior to use with identification codes specific to the mobile system on which the device was to be activated, and/or requiring the user to enter personal codes or to otherwise configure the device for use in a specific mobile system. Particularly as the number of mobile services expands, this approach adds significant complexity at all points in the distribution chain. Manufacturers and/or distributors must provide different pre-programmed devices to different areas, or must provide devices (and related instructions) that can be customized in each locale. Retailers must carry larger and more varied inventories, invest in additional sales training, and/or incur longer sales cycles. End-users must become more involved in the communications function itself rather than in the use or application of the device or service they are buying. Complexities at all levels limit the development of broad new classes of mobile products and services in which the communications function is transparent to users.

U.S. Pat. No. 5,454,027 to Kennedy et al. discloses a phantom mobile identification number method and apparatus. The system disclosed uses a variable mobile identification number (MIN) that has three parts which include one part set according to the area code of the cellular network system in which the user is presently located. When a roamer cellular telephone first enters a new system, the telephone device determines the identity of the new system by reading the broadcast signal from the system. The device then sets its NPA number of it's MIN for the current area code.

U.S. Pat. No. 5,159,625 to Zicker, discloses a method of selecting the cellular system with which a cellular telephone communicates. The invention consists of a method by which the cellular phone selects a plurality of frequency sets upon which to communicate.

SUMMARY OF THE INVENTION

The present invention provides a method for the self registration and authentication of wireless telephony devices. The invention provides a protocol that permits a mobile device to seek out a participating mobile provider's system, register as an authenticated device, and initiate communications. All of these functions are performed in a manner transparent to the device retailer and/or end-user.

According to the invention, a self-registration and authentication protocol is embedded into a wireless telephony product. The method of the protocol permits the mobile device to seek out a participating mobile provider's system, register as an authenticated device, and initiate communications.

The method of the invention initiates a System or Network Identification ("SID/NID") seeking routine and determines whether the device's activation state is a first time or previously activated state. Based on this determination, the protocol performs a first time activation or previously activated sub-routine. These sub-routines enable or disable the mobile device based on received and stored SID/NID information.

It is therefore an object of the present invention to provide a method for self registration and authentication of wireless telephony devices that alleviates the need to produce, distribute, or stock different device or product versions in order for users to correctly register with different mobile providers in different areas of the country It is another object of the invention to provide a method for self registration and authentication of wireless telephony devices that simplifies roaming services for traditional mobile telephone use.

It is another object of the invention to provide a method for self registration and authentication of wireless telephony devices that includes protocol that could be embedded within the wireless telephony device or product.

Yet another object of the invention is to provide a method for self registration and authentication of wireless telephony products that permit the mobile device or product to seek out the proper frequency, and register with them appropriate mobile provider when that frequency is not limited to single frequency block.

BRIEF DESCRIPTION OF THE DRAWINGS

Other objects and features of the present invention will become apparent from the following detailed description considered in connection with the accompanying drawings which disclose an embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

The protocol logic, or program steps, needed to implement self-registration and authentication of wireless telephony devices is embodied both in the devices themselves and in the mobile switching system of the wireless provider authorized to provide communications for those devices or services. This logic is provided in addition to the standard wireless protocols used by the mobile devices and systems for normal registration, authentication, and communications.

Figure 1:
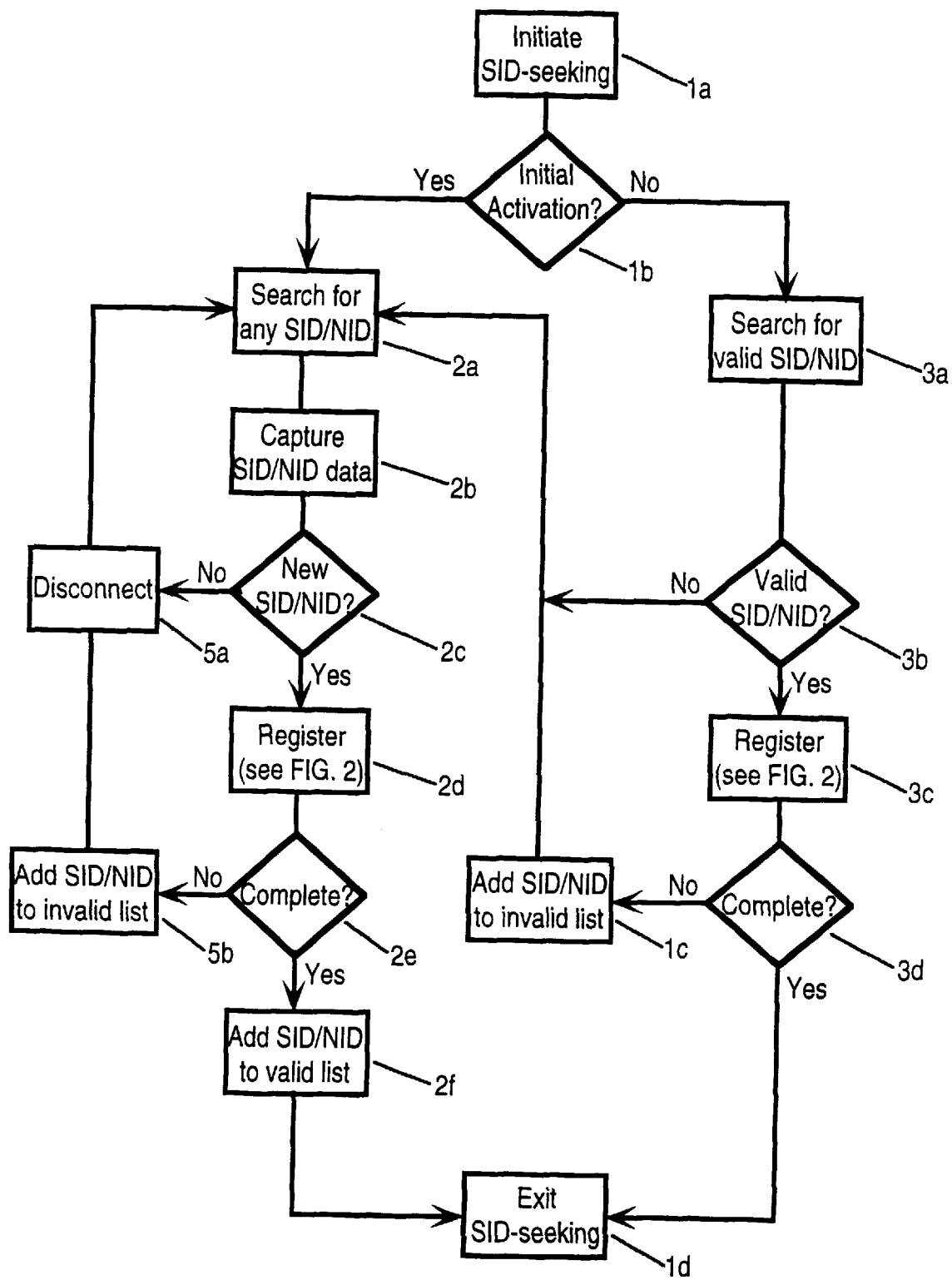
FIG. 1 is a block diagram of the basic System Identification—(SID) seeking algorithm used by each mobile wireless device or transceiver.

Turning now in detail to the drawings, FIG. 1 shows a flowchart of the additional logic required in the wireless devices. In the preferred embodiment, this logic would is embedded in the firmware of the wireless transceiver of the mobile device.

The flowchart of FIG. 1 shows two basic branches to which control is transferred depending upon whether the device is attempting to activate itself for the first time (steps 2a–2f) or whether it had been previously activated (steps 3*a*–3*d*). The basic branch choice is made at the first decision point after the SID-seeking routine is initiated (i.e., step 1*b*). If this is not an initial activation, the device proceeds to register in a traditional manner. Only if this process fails (which could occur if the device was subsequently used in a different license area or, even in the same area, if the authorized provider relationship was changed) does the device revert to the SID-seeking portion of the protocol.

If this is an initial activation (or, alternatively, if a previously activated device failed to find an authorized signal or failed to register), the additional SID-seeking logic is initiated. This protocol provides the basis for the self-registration and authentication process.

Figure 2:
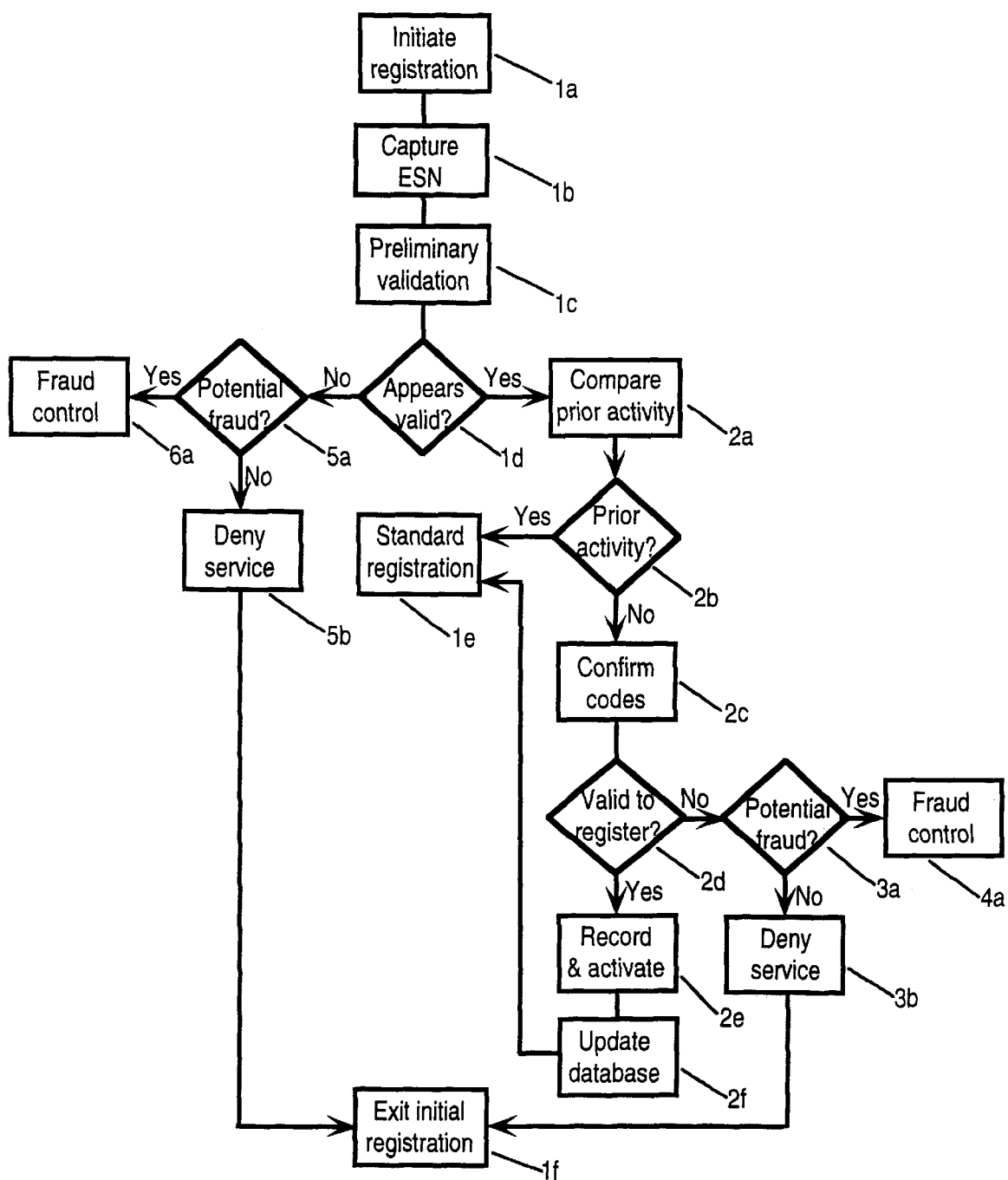
FIG. 2 is a block diagram of the existing and additional logic to be embedded in the mobile provider's system to permit self-registration and authentication according to the invention.

FIG. 2 shows a flowchart that includes the initial portion of a generic registration process that is representative of the basic logic typically embedded within a wireless provider's mobile system to register any device requesting service. Normally, after series of basic identification and authentication tests, control of the process would transfer to a standard registration routine as shown in the shaded box in the center of the diagram (step 1*e*). Alternatively, in the event of an identification or authentication problem, service would be denied (step 5*b*) or control would be transferred to a more robust fraud control routine (step 6*a*).

The SID-seeking routine works as follows. When a device is turned on and ready to communicate, the SID-seeking routine is initiated (step 1*a*). The routine is comprised of two basic branches to which control is transferred depending upon whether the device is attempting to activate itself for the first time or whether it had been previously activated (step 1*b*). An internal list of valid and invalid SID/NID codes is maintained in the device; for an initial activation, both lists are empty at this point.

If this is an initial activation (or, alternatively, if a previously activated device failed to find an authorized signal or failed to register), the device begins a search for the identifying signal of any system broadcasting within the target frequency range (step 2*a*). Once a signal is found, the device captures and records the SID/NID code (step 2*b*), and checks to determine if that code had previously been found to be invalid (step 2*c*). If the code is known to be invalid, the device disconnects and goes back to search for a new signal. If the SID/NID code is not invalid, the device attempts to register on that system (step 2*d*). For registration to succeed, the system would have been pre-authorized to provide communications to that class of products or services, and would have been provided with the additional system logic shown in FIG. 2. Unauthorized systems would be unable to authenticate the devices; the registration attempt would fail.

If the registration succeeds (determined in step 2*e*), the SID/NID code is recorded as valid and the SID-seeking routine is completed (step 1*d*). In the event of a registration failure, the SID/NID code is added to a list of invalid codes (step 5*b*), the communications with that system is terminated (step 5*a*), and the device begins a search for a new signal.

If this is a subsequent activation, the device would have already recorded a valid SID/NID code and can begin to search for a specific system (step 3*a*). If found (step 3*b*), the device proceeds to register (step 3*c*) and complete the routine. Only if this process fails, either because a valid system signal cannot be found or the registration no longer works (step 3*d*), does the device revert to the SID-seeking portion of the protocol (steps 2*a*–2*f*).

The logic required within each authorized mobile system to support self-registration and authentication of wireless telephony devices is shown in FIG. 2. The flowchart. shown includes the initial portion of a generic registration process that is representative of the basic logic typically embedded within a typical mobile system to register any device requesting service. The additional logic needed to support self-registration is shown within the context of this generic registration process.

When a mobile device first attempts to establish communications with a mobile system, a registration routine is initiated (step 1*a*). As a preliminary step, the system seeks to capture certain critical information from the device including its electronic serial number (ESN) and, if applicable, additional authentication and service option codes (step 1*b*). Normally, after a series of basic identification and authentication tests (steps 1*c* and 1*d*), control of the process would transfer to a standard registration routine as shown in the shaded box (step 1*e*). In the event of an identification or authentication problem, service would be denied (step 5*b*) and the registration process would be terminated (step 1*f*). Alternatively, in the event of potential fraud (step 5*a*), control could be transferred to a more robust fraud control routine (step 6*a*).

To permit self-registration, however, several additional steps are required. In particular, a check must be made to determine if a device is attempting to register for the first time. This is done by comparing the device's identification data with a list of comparable data for previously registered devices (step 2*a*). If the device is known to the system, then control can be transferred to a standard registration routine (steps 2*b* and 1*e*). Otherwise, the system assumes that the device needs to establish an initial registration. This is done by checking the validity of the device's identification, authentication, and/or service codes against the appropriate information provided by an authorizing entity (step 2*c*). The validating information may have been provided and stored with the local mobile provider or, for greater control, may be maintained within a central database serving multiple locally authorized providers. If a new device is deemed invalid (step 2*d*), service is either simply denied (step 3*b*) or, in the case of potential fraud (step 3*a*), control is again passed to a fraud routine (step 4*a*).

If a new device is validated for registration, its data is recorded (step 2*e*) and, assuming a centralized service, the database is notified and updated (step 2*f*). This completes the self-registering process; the wireless device is now activated, and control is transferred to the system's standard registration routine (step 1*e*).

Logic needed to support self-registration is shown within the context of this generic registration process (steps 2*a*–2*f*). In the preferred embodiment, it is assumed that more than one mobile system provider (typically, ones in different license areas) would be authorized to provide communications services to a given class of self-registering product or services. In such a case, it is assumed that a central database, referenced in two steps of the additional logic (steps 2*c* and 2*e*), would be queried and updated upon initial registration.

With minor modifications, however, the self-registration and authentication process can be extended to devices designed for multiple applications or mobility. In both cases, provisions can be made to permit a single device to register with multiple systems at different times and places or under different conditions. Two broad classes of use can be accommodated.

1. Mobile device "roaming" is one use. Cellular telephone users, as an example, have traditionally been able to use their handsets when operating in areas not served by their own mobile system operator. Traditionally, this has been facilitated by roaming agreements arranged between providers in different areas but all licensed to use the same frequency band and all adhering to the same analog air interface standards.

With the emergence of PCS, characterized by six licensed frequency bands and several incompatible digital air interface standards (or even with the new digital cellular services which may employ different standards in different areas on the same frequency band), roaming agreements may be arranged between providers operating on different frequency bands. The current digital PCS and cellular protocols require roaming users to manually reprogram their handsets for the appropriate band. The correct band must either be known or must be found on a trial and error basis. The self-registration and authentication protocol embodied in this invention will automate the reprogramming function, facilitating and simplifying roaming for the users.

2. Multiple applications on general purpose devices is another use. Personal computers, as an example, may use communications services in a variety of programs. By embedding most of the required device logic for self-registration and authentication in the communications software of each application (as opposed to embedding it as firmware in the transceiver itself, as contemplated in the preferred embodiment), a single PC device could communicate using different mobile systems. This will permit different program or system vendors to negotiate separate authorization contracts with different sets of mobile providers, independent of the other applications.

To support mobile or roaming usage outside the "home" system or network, the only change required is to permit multiple or temporary system identifiers. As shown in FIG. 1, a previously activated device, now not seeking to operate on its "home" system, will first search for (step 3a), but fail to find (step 3b), a valid identifier. At this point, the device begins searching for new identifiers (step 2a) as in an initial activation. The only modification that is suggested (but not required) is to create two sets of lists for valid and invalid SID/NID codes (at steps 2f and 5b), a permanent set for home territory codes and a temporary set for roaming codes. No changes are required in the additional system logic (FIG. 2), although the database used, and the information captured in it, may differ depending upon specific provisions of the inter-system roaming agreements.

To support multiple applications on general purpose devices, the additional device logic (FIG. 1) would best be embedded in the application software, using a separate version of the subroutine or logic for each application. Lists of valid or invalid codes (at steps 1c, 2f, and 5b) would then be compiled and maintained within each application and associated authorized mobile provider. No changes are required in the additional system logic (FIG. 2).

Accordingly, it can be seen that the self-registration and authentication logic or protocol specified in this invention provides a means by which wireless communications services can be associated with a variety of devices and/or applications without the direct intervention of the user or retailer.

The invention supports the development of national or regional distribution and communications services channels for communicating devices and/or application programs without requiring that such products be customized or pre-programmed for a specific frequency block or network identifier in order to find, recognize, and register with an authorized mobile provider in each licensed area.

Although the description above contains many specificities, these should not be construed as limiting the scope of the invention but as merely providing illustrations of some of the presently preferred embodiments of this invention. Various other embodiments and ramifications are possible within it's scope. For example, although the invention is described in the terminology associated with a specific air interface technology (the mobile industry's IS-95 standard), the device and system logic is applicable to a broad range of wireless services and technology standards.

Future enhancements in authentication (anti-fraud) methods should be compatible with, and even enhance, the effectiveness of the self-registration process. The additional device logic required (for single, multiple, or roaming applications) can be incorporated through software, firmware, or even directly into logic circuits either in the basic device itself or in an internal or external (including PCMCIA cards) wireless transceiver.

While several embodiments of the present invention have been shown and described, it is to be understood that many changes and modifications may be made thereunto without departing from the spirit and scope of the invention as defined in the appended claims.

What is claimed is:

1. A method for self registration and authentication for wireless telephony services comprising the steps of:

initiating a system or network identification (SID/NID) seeking routine;

determining whether the device's activation state is first time or previously activated;

performing a first time activation routine in response to said first time activation determination;

performing a previously activated routine in response to said previously active determination; and registering the device for use on the mobile provider's system by initiating a registration routine, capturing device identification information, authenticating the validity of the captured information, comparing the captured identification information for prior activity, and registering the device when prior activity has been confirmed.

2. The method according to claim 1, wherein said step of registering the device when prior activity has been determined further comprises the steps of:

confirming the validity of captured identification information when prior activity is not present;

recording the captured identification information;

activating the device when validity of captured identification information is confirmed;

updating a database with the captured identification information; and running a standard registration routine for the device.

3. The method according to claim 2, wherein said step of confirming the validity of captured identification information further comprises the steps of:

determining the potential fraud of the captured identification information; and denying service to the device.

4. The method according to claim 2, further comprising the step of transferring the device to a fraud control routine.

5. The method according to claim 1, wherein said step of authenticating the validity further comprises the steps of:

determining the potential fraud of the captured identification information; and denying service to the device.

6. The method according to claim 5, further comprising the step of transferring the device to a fraud control routine.

7. The method according to claim 1, wherein said device identification information comprises electronic serial numbers (ESN), authentication and service option codes from the device.

8. A method for self registration and authentication for wireless telephony devices comprising the steps of:
- initiating a system or network identification (SID/NID) seeking routine;
- determining whether the device's activation state is first time or previously activated by referring to a list of valid and invalid SID/NID data internally stored in the device;
- performing a first time activation routine in response to said first time activation determination by searching for SID/NID data within a target frequency range, capturing the SID/NID data found, determining the validity of the SID/NID data, and registering the device for valid communication when SID/NID data is found;
- performing a previously activated routine in response to said previously active determination; and
- registering the device for use on the mobile provider's system.

9. The method according to claim 8, further comprising the steps of:
- adding SID/NID data to an invalid list when registration fails;
- disconnecting the device;
- restarting the first time activation routine.

10. The method according to claim 8, further comprising the steps of:
- adding SID/NID data to a valid list when registration is successfully completed; and
- exiting the SID/NID seeking routine.

11. A method for self registration and authentication for wireless telephony devices comprising the steps of:
- initiating a system or network identification (SID/NID) seeking routine;
- determining whether the device's activation state is first time or previously activated by referring to a list of valid and invalid SID/NID data internally stored in the device;
- performing a first time activation routine in response to said first time activation determination;
- performing a previously activated routine in response to said previously active determination by searching for valid SID/NID data stored in the device, re-initiating a first activation routine in response to no valid SID/NID data found, and registering the device for communication when valid SID/NID data is found; and
- registering the device for use on the mobile provider's system.

12. A method for self registration and authentication for wireless telephony devices comprising the steps of:
- initiating a system or network identification (SID/NID) seeking routine;
- determining whether the device's activation state is first time or previously activated by referring to a list of valid and invalid SID/NID data internally stored in the device;
- performing a first time activation routine in response to said first time activation determination;
- performing a previously activated routine in response to said previously active determination;
- registering the device for use on the mobile provider's system;
- adding SID/NID data to an invalid list if registration fails; and
- running said first time activation routine if said registration fails.

* * * * *

UNITED STATES PATENT AND TRADEMARK OFFICE
CERTIFICATE OF CORRECTION

PATENT NO. : 5,999,812
DATED : December 7, 1999
INVENTOR (S) : HIMSWORTH

It is certified that error appears in the above-identified patent and that said Letters Patent is hereby corrected as shown below:

Title Page, insert the following:

--Related U.S. Application Data
  [60] Provisional application No 60/023,778, Aug. 9, 1996 --.

Column 1, line 2, insert the following:

--CROSS REFERENCE TO RELATED APPLICATION
  Reference is made to and priority claimed from U.S. Provisional application Ser. No. US 60/023,778 filed Aug. 9, 1996. --

Signed and Sealed this

Twenty-sixth Day of September, 2000

*Attest:*

Q. TODD DICKINSON

*Attesting Officer*  *Director of Patents and Trademarks*